(12) United States Patent
Lee et al.

(10) Patent No.: US 9,840,910 B2
(45) Date of Patent: Dec. 12, 2017

(54) FLUID PRESSURE PULSE GENERATOR FOR A DOWNHOLE TELEMETRY TOOL

(71) Applicant: EVOLUTION ENGINEERING INC., Calgary (CA)

(72) Inventors: Gavin Gaw-Wae Lee, Calgary (CA); Justin C. Logan, Calgary (CA); Aaron W. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 15/320,571

(22) PCT Filed: Jun. 25, 2015

(86) PCT No.: PCT/CA2015/050587
§ 371 (c)(1),
(2) Date: Dec. 20, 2016

(87) PCT Pub. No.: WO2015/196289
PCT Pub. Date: Dec. 30, 2015

(65) Prior Publication Data
US 2017/0198570 A1    Jul. 13, 2017

Related U.S. Application Data

(60) Provisional application No. 62/016,902, filed on Jun. 25, 2014.

(51) Int. Cl.
*E21B 47/18* (2012.01)
*E21B 34/08* (2006.01)
*G01V 1/52* (2006.01)

(52) U.S. Cl.
CPC ............ *E21B 47/187* (2013.01); *E21B 34/08* (2013.01); *G01V 1/52* (2013.01)

(58) Field of Classification Search
CPC ........ E21B 47/187; E21B 34/08; E21B 47/18; G01V 1/52
(Continued)

(56) References Cited

U.S. PATENT DOCUMENTS

| 3,739,331 A | 6/1973 | Godbey et al. |
| 4,914,637 A | 4/1990 | Goodsman |

(Continued)

FOREIGN PATENT DOCUMENTS

| CA | 1228909 | 11/1987 |
| CA | 1268052 | 4/1990 |

(Continued)

OTHER PUBLICATIONS

The International Search Report and Written Opinion dated Sep. 18, 2015, in PCT/CA2015/050587, filed Jun. 25, 2015.

(Continued)

*Primary Examiner* — Albert Wong
(74) *Attorney, Agent, or Firm* — Hovey Williams LLP

(57) ABSTRACT

A fluid pressure pulse generator for a downhole telemetry tool comprising a stator and a rotor. The stator has a stator body and a plurality of radially extending stator projections spaced around the stator body, with adjacently spaced stator projections defining stator flow channels extending therebetween. The rotor has a rotor body and a plurality of radially extending rotor projections spaced around the rotor body, with adjacently spaced rotor projections defining rotor flow channels extending therebetween. The rotor projections are axially adjacent the stator projections. The rotor is rotatable relative to the stator and is configured to oscillate from an open flow position an equal span of clockwise and counter clockwise rotation to first and second restricted flow positions. In the open flow position the rotor projections align with the stator projections with an axial central line of the (Continued)

stator projections circumferentially offset from an axial central line of the rotor projections and the rotor flow channels are in fluid communication with the stator flow channels so that drilling fluid flows through the fluid pressure pulse generator apparatus. In the first and second restricted flow positions the rotor projections are in fluid communication with the stator flow channels to create a pressure pulse in the drilling fluid flowing through the fluid pressure pulse generator apparatus. The equal span of clockwise and counter clockwise rotation is selected so that a gap is formed between the rotor projections and the stator projections in at least one of the first and second restricted flow positions for flow of drilling fluid therethrough and a greater proportion of the rotor projections is in fluid communication with the stator flow channels in one of the first and second restricted flow positions than in the other of the first and second restricted flow positions. The fluid pressure pulse generator creates pressure pulses with different pulse heights through symmetrical rotation of the rotor relative to the stator.

18 Claims, 16 Drawing Sheets

(58) Field of Classification Search
USPC .............................................. 367/83; 175/48
See application file for complete search history.

(56) References Cited

U.S. PATENT DOCUMENTS

| | | | |
|---|---|---|---|
| 5,357,483 A | 10/1994 | Innes | |
| 5,586,083 A | 12/1996 | Chin et al. | |
| 5,636,178 A | 6/1997 | Ritter | |
| 5,740,126 A | 4/1998 | Chin et al. | |
| 7,083,008 B2 | 8/2006 | Thorp et al. | |
| 7,133,325 B2 | 11/2006 | Kotsonis et al. | |
| 7,230,880 B2 | 6/2007 | Lehr | |
| 8,020,632 B2 | 9/2011 | Moriarty | |
| 8,138,943 B2 | 3/2012 | Kusko et al. | |
| 8,151,905 B2 | 4/2012 | Song | |
| 8,181,719 B2 | 5/2012 | Bunney et al. | |
| 2003/0056985 A1* | 3/2003 | Hahn | E21B 47/18 175/48 |
| 2009/0266544 A1 | 10/2009 | Redlinger et al. | |
| 2011/0280105 A1 | 11/2011 | Hall et al. | |
| 2014/0028293 A1 | 1/2014 | Johnson et al. | |
| 2015/0218937 A1* | 8/2015 | Conn | E21B 47/18 367/83 |

FOREIGN PATENT DOCUMENTS

| | | |
|---|---|---|
| CA | 1299998 | 5/1992 |
| CA | 2174017 | 10/1996 |
| CA | 2098676 | 11/1997 |
| CA | 2528999 | 9/2009 |
| CA | 2506912 | 7/2013 |
| CA | 2855930 | 5/2014 |
| CN | 203271731 | 11/2013 |
| CN | 203452776 | 2/2014 |
| CN | 103410503 | 6/2016 |
| GB | 2271790 | 2/1996 |
| GB | 2443096 | 10/2008 |
| WO | 2014/071514 | 5/2014 |

OTHER PUBLICATIONS

The International Search Report and Written Opinion dated Sep. 23, 2015, in PCT/CA2015/050586, filed Jun. 25, 2015.
The International Search Report and Written Opinion dated Sep. 22, 2015, in PCT/CA2015/050576, filed Jun. 22, 2015.
The International Search Report and Written Opinion dated Jan. 17, 2017, in PCT/CA2016/051298, filed Nov. 8, 2016.

* cited by examiner

FLUID PRESSURE PULSE GENERATOR FOR A DOWNHOLE TELEMETRY TOOL

RELATED APPLICATIONS

This is a national stage application under 35 U.S.C. §371 of International Patent Application No. PCT/CA2015/050587, filed Jun. 25, 2015, which claims benefit of U.S. Provisional Patent Application No. 62/016,902, filed Jun. 25, 2014, both of which are incorporated by reference in their entireties.

FIELD

This disclosure relates generally to a fluid pressure pulse generator for a downhole telemetry tool, such as a mud pulse telemetry measurement-while-drilling ("MWD") tool.

BACKGROUND

The recovery of hydrocarbons from subterranean zones relies on the process of drilling wellbores. The process includes drilling equipment situated at surface, and a drill string extending from the surface equipment to a below-surface formation or subterranean zone of interest. The terminal end of the drill string includes a drill bit for drilling (or extending) the wellbore. The process also involves a drilling fluid system, which in most cases uses a drilling "mud" that is pumped through the inside of piping of the drill string to cool and lubricate the drill bit. The mud exits the drill string via the drill bit and returns to surface carrying rock cuttings produced by the drilling operation. The mud also helps control bottom hole pressure and prevent hydrocarbon influx from the formation into the wellbore, which can potentially cause a blow out at surface.

Directional drilling is the process of steering a well from vertical to intersect a target endpoint or follow a prescribed path. At the terminal end of the drill string is a bottom-hole-assembly ("BHA") which comprises 1) the drill bit; 2) a steerable downhole mud motor of a rotary steerable system; 3) sensors of survey equipment used in logging-while-drilling ("LWD") and/or measurement-while-drilling ("MWD") to evaluate downhole conditions as drilling progresses; 4) means for telemetering data to surface; and 5) other control equipment such as stabilizers or heavy weight drill collars. The BHA is conveyed into the wellbore by a string of metallic tubulars (i.e. drill pipe). MWD equipment is used to provide downhole sensor and status information to surface while drilling in a near real-time mode. This information is used by a rig crew to make decisions about controlling and steering the well to optimize the drilling speed and trajectory based on numerous factors, including lease boundaries, existing wells, formation properties, and hydrocarbon size and location. The rig crew can make intentional deviations from the planned wellbore path as necessary based on the information gathered from the downhole sensors during the drilling process. The ability to obtain real-time MWD data allows for a relatively more economical and more efficient drilling operation.

One type of downhole MWD telemetry known as mud pulse telemetry involves creating pressure waves ("pulses") in the drill mud circulating through the drill string. Mud is circulated from surface to downhole using positive displacement pumps. The resulting flow rate of mud is typically constant. The pressure pulses are achieved by changing the flow area and/or path of the drilling fluid as it passes the MWD tool in a timed, coded sequence, thereby creating pressure differentials in the drilling fluid. The pressure differentials or pulses may be either negative pulses or positive pulses. Valves that open and close a bypass stream from inside the drill pipe to the wellbore annulus create a negative pressure pulse. All negative pulsing valves need a high differential pressure below the valve to create a sufficient pressure drop when the valve is open, but this results in the negative valves being more prone to washing. With each actuation, the valve hits against the valve seat and needs to ensure it completely closes the bypass; the impact can lead to mechanical and abrasive wear and failure. Valves that use a controlled restriction within the circulating mud stream create a positive pressure pulse. Pulse frequency is typically governed by pulse generator motor speed changes. The pulse generator motor requires electrical connectivity with the other elements of the MWD probe.

One type of valve mechanism used to create mud pulses is a rotor and stator combination where a rotor can be rotated relative to the fixed stator between an open flow position where there is no restriction of mud flowing through the valve and no pulse is generated, and a restricted flow position where there is restriction of mud flowing through the valve and a pressure pulse is generated.

SUMMARY

According to a first aspect, there is provided a fluid pressure pulse generator apparatus for a downhole telemetry tool, comprising a stator and a rotor. The stator comprises a stator body and a plurality of radially extending stator projections spaced around the stator body, whereby adjacently spaced stator projections define stator flow channels extending therebetween. The rotor comprises a rotor body and a plurality of radially extending rotor projections spaced around the rotor body, whereby adjacently spaced rotor projections define rotor flow channels extending therebetween. The rotor projections are axially adjacent the stator projections. The rotor is rotatable relative to the stator and is configured to oscillate from an open flow position an equal span of clockwise and counter clockwise rotation to first and second restricted flow positions. In the open flow position the rotor projections align with the stator projections with an axial central line of the stator projections circumferentially offset from an axial central line of the rotor projections and the rotor flow channels are in fluid communication with the stator flow channels so that drilling fluid flows through the fluid pressure pulse generator apparatus. In the first and second restricted flow positions the rotor projections are in fluid communication with the stator flow channels to create a pressure pulse in the drilling fluid flowing through the fluid pressure pulse generator apparatus. The equal span of clockwise and counter clockwise rotation is selected so that a gap is formed between the rotor projections and the stator projections in at least one of the first and second restricted flow positions for flow of drilling fluid therethrough. A greater proportion of the rotor projections are in fluid communication with the stator flow channels in one of the first and second restricted flow positions than in the other of the first and second restricted flow positions.

The rotor projections may be downhole relative to the stator projections. The rotor projections may have a radial profile with an uphole end, a downhole end and two opposed side faces extending therebetween. A section of the radial profile of at least one of the rotor projections may be tapered towards the uphole end, whereby if rotation is stopped when the tapered section of the at least one rotor projection is in fluid communication with the stator flow channels the drilling fluid impinging on the tapered section moves the rotor until the tapered section of the at least one rotor projection is out of fluid communication with the stator flow channels. At least one of the side faces of the tapered rotor projection may have a bevelled uphole edge or both of the side faces of the tapered rotor projection may have a bevelled uphole edge.

The stator projections may have a radial profile with an uphole end, a downhole end and two opposed side faces extending therebetween. The uphole end of at least one of the stator projections may be rounded. A section of the radial profile of at least one of the stator projections may be tapered towards the uphole end.

At least one of the rotor projections may taper radially in the downhole direction. The at least one radially tapered rotor projection may be longitudinally extended.

An uphole end of the stator body may be configured to fixedly attach to a downhole end of a pulser assembly of the downhole telemetry tool. An uphole end of the stator body may be configured to couple with a downhole end of a pulser assembly of the downhole telemetry tool. The stator body may have a bore therethrough and at least a portion of the rotor body may be received within the bore. The rotor body may have a bore therethrough configured to receive a downhole portion of a driveshaft extending from the pulser assembly. The apparatus may further comprise a rotor cap comprising a cap body and a shaft which is received in the bore of the rotor body. The rotor cap may be configured to releasably attach the rotor to the driveshaft. A downhole end of the cap body may be rounded.

According to a second aspect, there is provided a downhole telemetry tool comprising a pulser assembly and the fluid pressure pulse generator apparatus of the first aspect. The pulser assembly comprises a housing, a motor fixedly coupled to the housing, and a driveshaft rotationally coupled to the motor. The driveshaft is fixedly attached to the rotor and the motor can rotate the driveshaft and the rotor relative to the stator.

According to a second aspect, there is provided a downhole telemetry tool comprising a pulser assembly and the fluid pressure pulse generator apparatus of the first aspect. The pulser assembly comprises a housing enclosing a motor and a driveshaft rotationally coupled to the motor. The driveshaft is coupled to the rotor and the motor can rotate the driveshaft and the rotor relative to the stator.

According to another aspect, there is provided a method of generating a fluid pressure pulse pattern in downhole drilling fluid comprising a first fluid pressure pulse and a second fluid pressure pulse whereby the first fluid pressure pulse is greater than the second fluid pressure pulse. The method comprises providing the downhole telemetry tool of the second aspect, and controlling the motor to oscillate the rotor between the open flow position and the first and second restricted flow positions, whereby rotation to one of the first and second restricted flow positions creates the first pressure pulse and rotation to the other of the first and second restricted flow positions creates the second pressure pulse.

This summary does not necessarily describe the entire scope of all aspects. Other aspects, features and advantages will be apparent to those of ordinary skill in the art upon review of the following description of specific embodiments.

DETAILED DESCRIPTION OF EMBODIMENTS

Directional terms such as "uphole" and "downhole" are used in the following description for the purpose of providing relative reference only, and are not intended to suggest any limitations on how any apparatus is to be positioned during use, or to be mounted in an assembly or relative to an environment.

The embodiments described herein generally relate to a fluid pressure pulse generator of a MWD tool that can generate pressure pulses. The fluid pressure pulse generator may be used for mud pulse ("MP") telemetry used in downhole drilling, wherein a drilling fluid (herein referred to as "mud") is used to transmit telemetry pulses to surface. The fluid pressure pulse generator may alternatively be used in other methods where it is necessary to generate a fluid pressure pulse. The fluid pressure pulse generator comprises a stator fixed to a pulser assembly of the MWD tool or the drill collar and a rotor coupled to a motor in the pulser assembly which rotates the rotor relative to the fixed stator.

Figure 1:
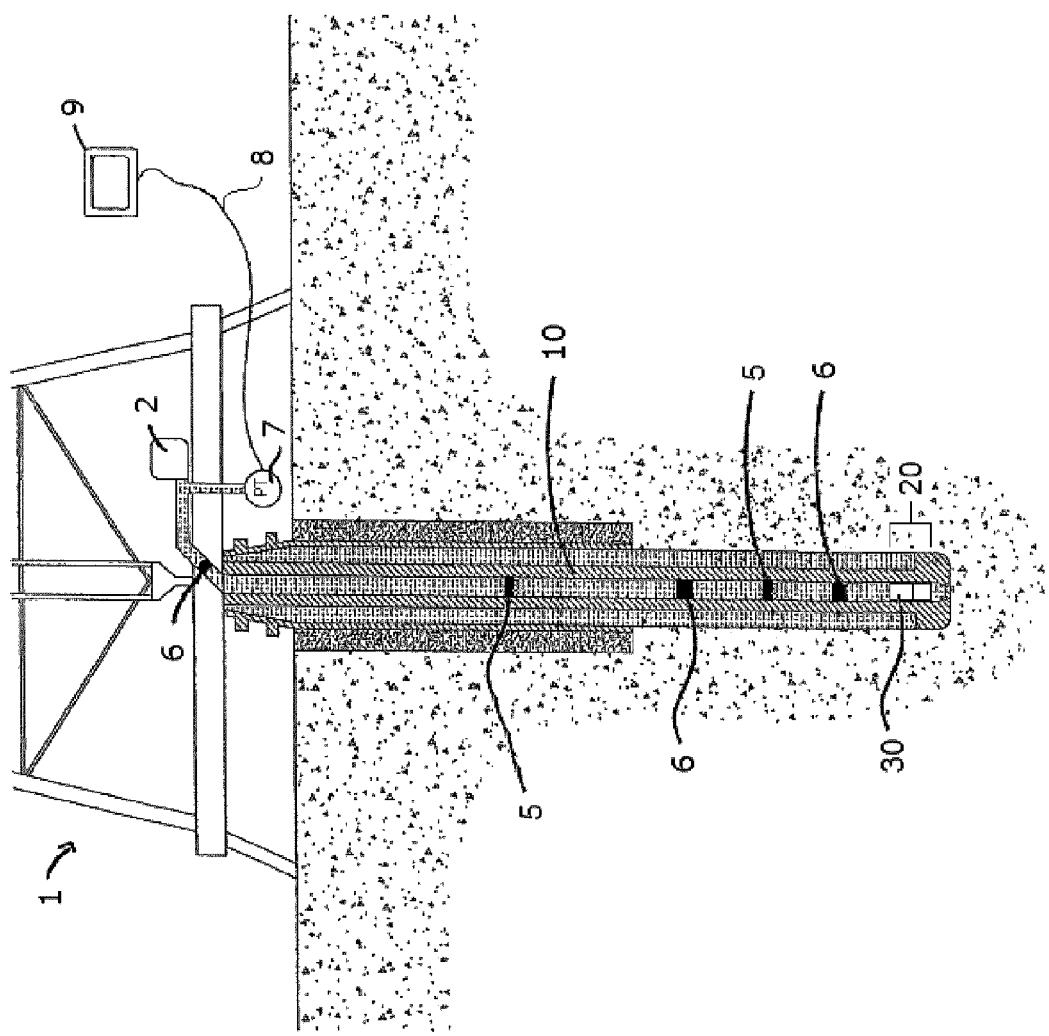
FIG. 1 is a schematic of a drill string in an oil and gas borehole comprising a MWD telemetry tool according to embodiments described herein.

Referring to the drawings and specifically to FIG. 1, there is shown a schematic representation of a MP telemetry operation using a fluid pressure pulse generator 30 according to embodiments described herein. In downhole drilling equipment 1, drilling mud is pumped down a drill string by pump 2 and passes through a measurement while drilling ("MWD") tool 20. The MWD tool 20 includes a fluid pressure pulse generator 30. The fluid pressure pulse generator 30 has an open flow position in which mud flows relatively unimpeded through the pressure pulse generator 30 and no pressure pulse is generated, a full restricted flow position where flow of mud through the pressure pulse generator 30 is restricted and a full positive pressure pulse is generated (represented schematically as block 6 in mud column 10), and a partial restricted flow position where flow of mud through the pressure pulse generator 30 is partially restricted and a reduced positive pressure pulse is generated (represented schematically as block 5 in mud column 10). Reduced pressure pulse 5 is of a smaller pulse height compared to the full pressure pulse 6. Information acquired by downhole sensors (not shown) is transmitted in specific time divisions by pressure pulses 5, 6 in the mud column 10. More specifically, signals from sensor modules in the MWD tool 20, or in another downhole probe (not shown) communicative with the MWD tool 20, are received and processed in a data encoder in the MWD tool 20 where the data is digitally encoded as is well established in the art. This data is sent to a controller in the MWD tool 20 which then actuates the fluid pressure pulse generator 30 to generate pressure pulses 5, 6 which contain the encoded data. The pressure pulses 5, 6 are transmitted to the surface and detected by a surface pressure transducer 7 and decoded by a surface computer 9 communicative with the transducer by cable 8. The decoded signal can then be displayed by the computer 9 to a drilling operator. The characteristics of the pressure pulses 5, 6 are defined by duration, shape, and frequency; these characteristics are used in various encoding systems to represent binary data. The ability of the pressure pulse generator 30 to produce two different sized (height) pressure pulses 5, 6, may allow for greater variation in the binary data being produced and therefore may provide quicker and more accurate interpretation of downhole measurements.

Figure 2A:
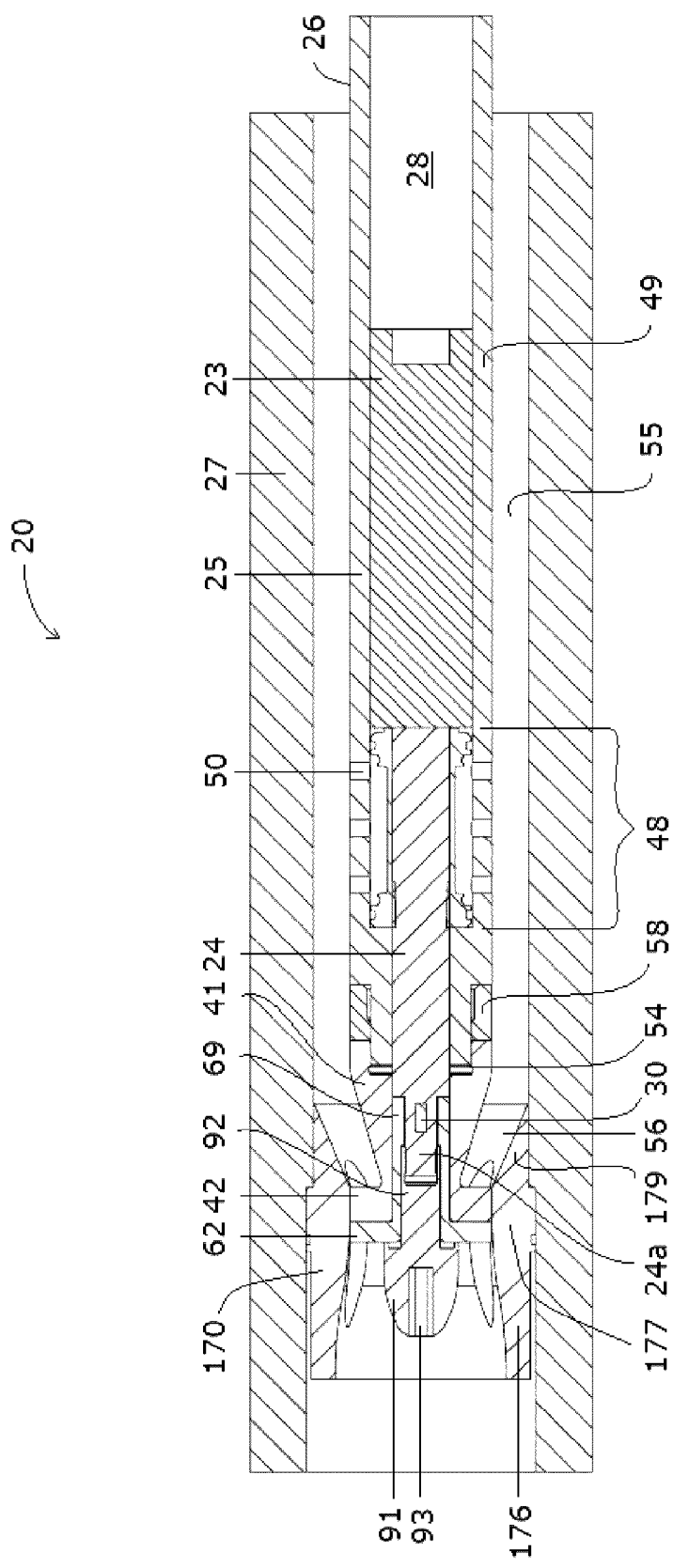
FIG. 2A is a longitudinally sectioned view of a mud pulser section of the MWD telemetry tool in a drill collar. The MWD tool includes a fluid pressure pulse generator with a stator and a rotor according to an embodiment and a flow bypass sleeve according to a first embodiment that surrounds the fluid pressure pulse generator.
Figure 2B:
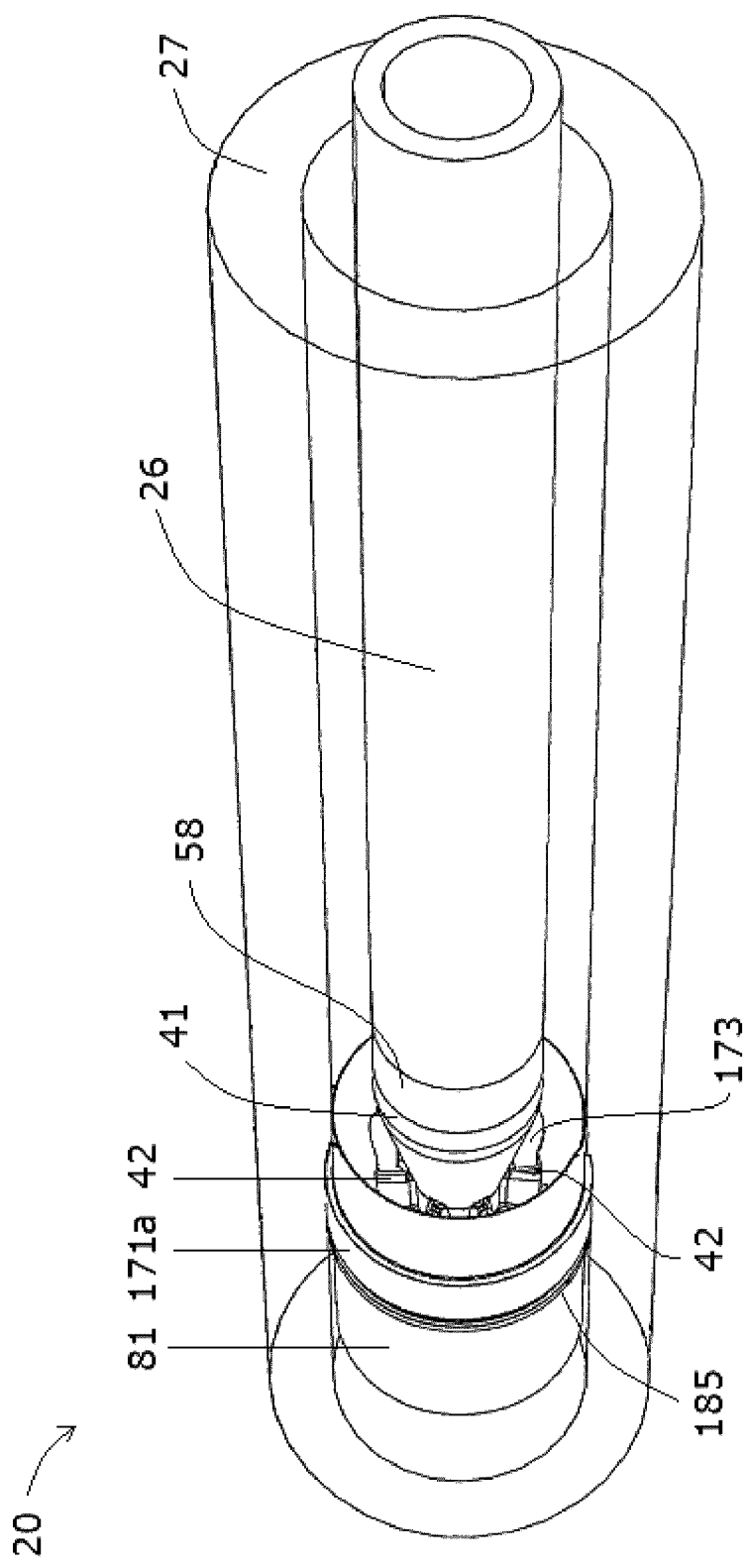
FIG. 2B is a perspective view of the mud pulser section of the MWD tool shown in FIG. 2A with the drill collar shown as transparent.
Figure 3:
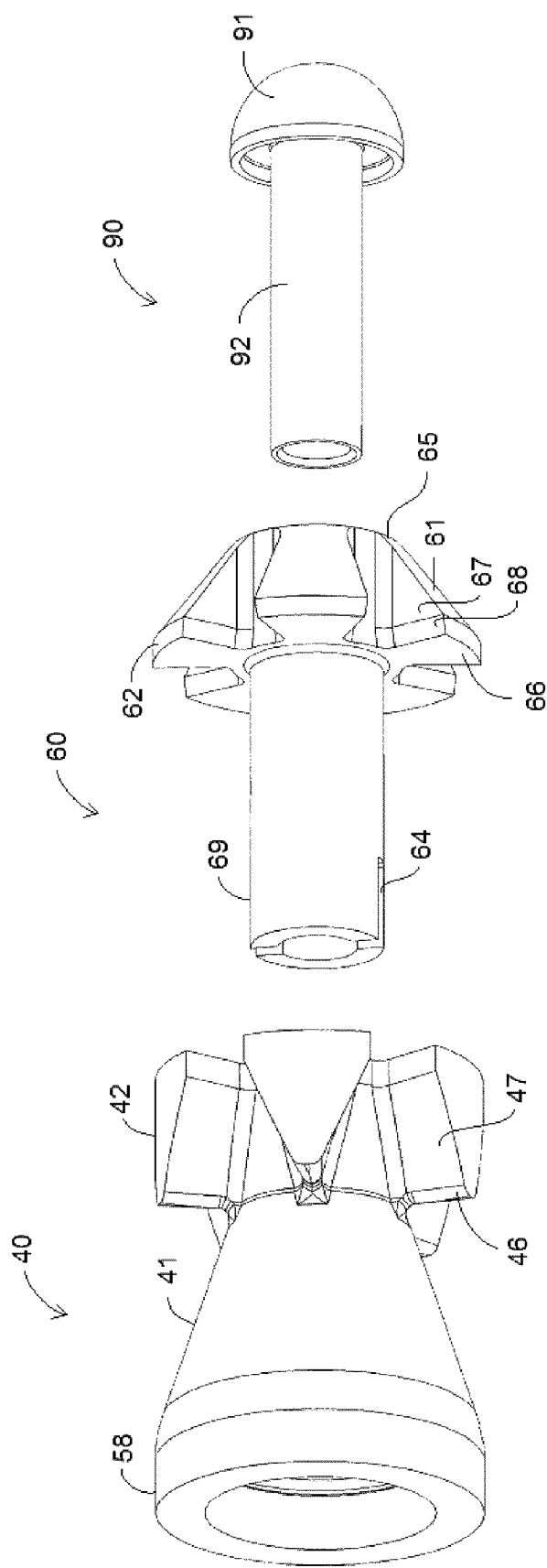
FIG. 3 is an exploded view of the fluid pressure pulse generator.

Referring to FIGS. 2a and 2b, a mud pulser section of the MWD tool 20 is shown in more detail. The MWD tool 20 generally comprises the fluid pressure pulse generator 30 which creates fluid pressure pulses, and a pulser assembly 26 which takes measurements while drilling and which drives the fluid pressure pulse generator 30. The fluid pressure pulse generator 30 and pulser assembly 26 are axially located inside a drill collar 27. A flow bypass sleeve 170 according to a first embodiment is received inside the drill collar 27 and surrounds the fluid pressure pulse generator 30. The flow bypass sleeve 170 is described in more detail below with reference to FIGS. 9 to 11. The pulser assembly 26 is fixed to the drill collar 27 with an annular channel 55 therebetween, and mud flows along the annular channel 55 when the MWD tool 20 is downhole. The pulser assembly 26 includes pulser assembly housing 49 enclosing a motor subassembly 25 and an electronics subassembly 28 electronically coupled together but fluidly separated by a feed-through connector (not shown). The motor subassembly 25 includes a motor and gearbox subassembly 23, a driveshaft 24 connected to the motor and gearbox subassembly 23, and a pressure compensation device 48. As described in more detail below with reference to FIGS. 3 to 8, the fluid pressure pulse generator 30 comprises a stator 40 and a rotor 60. The stator 40 comprises a stator body 41 fixed to the pulser assembly housing 49 and stator projections 42 radially extending around the downhole end of the stator body 41. The rotor 60 comprises a rotor body 69 fixed to the driveshaft 24 and rotor projections 62 radially extending around the downhole end of the rotor body 69. Rotation of the driveshaft 24 by the motor and gearbox subassembly 23 rotates the rotor 60 relative to the fixed stator 40. The electronics subassembly 28 includes downhole sensors, control electronics, and other components (not shown) required by the MWD tool 20 to determine direction and inclination information and to take measurements of drilling conditions, to encode this data using one or more known modulation techniques into a carrier wave, and to send motor control signals to the motor and gearbox subassembly 23 to rotate the driveshaft 24 and rotor 60 in a controlled pattern to generate pressure pulses 5, 6 representing the carrier wave for transmission to surface.

The motor subassembly 25 is filled with a lubricating liquid such as hydraulic oil or silicon oil and this lubricating liquid is fluidly separated from mud flowing along the annular channel 55 by an annular seal 54 which surrounds the driveshaft 24. The pressure compensation device 48 comprises a flexible membrane (not shown) in fluid communication with the lubrication liquid on one side and with mud on the other side via ports 50 in the pulser assembly housing 49; this allows the pressure compensation device 48 to maintain the pressure of the lubrication liquid at about the same pressure as the mud at the fluid pressure pulse generator 30. Without pressure compensation, the torque required to rotate the driveshaft 24 and rotor 60 would need high current draw with excessive battery consumption resulting in increased costs. In alternative embodiments (not shown), the pressure compensation device 48 may be any pressure compensation device known in the art, such as pressure compensation devices that utilize pistons, metal membranes, or a bellows style pressure compensation mechanism.

The fluid pressure pulse generator 30 is located at the downhole end of the MWD tool 20. Mud pumped from the surface by pump 2 flows along annular channel 55 between the outer surface of the pulser assembly 26 and the inner surface of the drill collar 27. When the mud reaches the fluid pressure pulse generator 30 it flows along an annular channel 56 between the external surface of the stator body 41 and the internal surface of the flow bypass sleeve 170. The rotor 60 rotates relative to the fixed stator 40 between an open flow position where mud flows freely through the fluid pressure pulse generator 30 resulting in no pressure pulse, a full restricted flow position where flow of mud is restricted to generate full pressure pulse 6, and a partial restricted flow position where flow of mud is partially restricted to generate reduced pressure pulse 5, as will be described in more detail below with reference to FIGS. 3 to 8.

Referring now to FIGS. 3 to 8, there is shown the stator 40 and rotor 60 which combine to form fluid pressure pulse generator 30. The stator 40 comprises longitudinally extending stator body 41 with a central bore therethrough. The stator body 41 comprises a cylindrical section at the uphole end and a generally frusto-conical section at the downhole end which tapers longitudinally in the downhole direction. As shown in FIGS. 2A and 2B, the cylindrical section of stator body 41 is coupled with the pulser assembly housing 49. More specifically, a jam ring 58 threaded onto the pulser assembly housing 49 is threaded on the stator body 41. Once the stator 40 is positioned correctly, the stator 40 is held in place and the jam ring 58 is backed off and torqued onto the stator 40 holding it in place. The stator 40 surrounds annular seal 54. Mud can enter the fluid pressure pulse generator 30 between the rotor 60 and the stator 40 however this entry point is downhole from annular seal 54 so the mud has to travel uphole against gravity to reach annular seal 54. The velocity of mud impinging on annular seal 54 may therefore be reduced and there may be less wear of seal 54 compared to other rotor/stator designs. The external surface of the pulser assembly housing 49 is flush with the external surface of the cylindrical section of the stator body 41 for smooth flow of mud therealong. In alternative embodiments (not shown) other means of coupling the stator 40 with the pulser assembly housing 49 may be utilized and the external surfaces of the stator body 41 and the pulser assembly housing 49 may not be flush.

A plurality of radially extending stator projections 42 are spaced equidistant around the downhole end of the stator body 41. Each stator projection 42 is tapered and narrower at its proximal end attached to the stator body 41 than at its distal end. The stator projections 42 have a radial profile with a rounded uphole end 46 and a downhole face 45, with two opposed side faces 47 extending therebetween. A section of the radial profile of each stator projection 42 is tapered towards the uphole end 46 such that the uphole end 46 is narrower than the downhole face 45. Mud flowing along the external surface of the stator body 41 contacts the rounded uphole end 46 of the stator projections 42 and flows through stator flow channels 43 defined by the side faces 47 of adjacently positioned stator projections 42. The stator flow channels 43 are curved or rounded at their proximal end closest to the stator body 41. The curved stator flow channels 43, as well as the rounded uphole end 46 and tapered radial profile of the stator projections 42 may allow for smooth flow of mud through the stator flow channels 43 and may reduce wear of the stator projections 42. In alternative embodiments (not shown) the stator projections 42 may be any shape and need not have a rounded uphole end 46 or any taper.

The rotor 60 comprises generally cylindrical rotor body 69 with a central bore therethrough and a plurality of radially extending projections 62 at the downhole end of rotor body 69. Rotor body 69 is received in the bore of the stator body 41. As shown in FIG. 2A, a downhole shaft 24a of the driveshaft 24 is received in uphole end of the bore of the rotor body 69 and a coupling key 30 extends through the driveshaft 24 and is received in a coupling key receptacle 64 at the uphole end of the rotor body 69 to couple the driveshaft 24 with the rotor body 69. In alternative embodiments the rotor body may be coupled with the driveshaft using magnetic coupling or some other coupling mechanism known in the art. A rotor cap 90 comprising a cap body 91 and a cap shaft 92 is positioned at the downhole end of the fluid pressure pulse generator 30. The cap shaft 92 is received in the downhole end of the bore in the rotor body 69 and threads onto the downhole shaft 24a of the driveshaft 24 to lock (torque) the rotor 60 to the driveshaft 24. The cap body 91 includes a hexagonal shaped opening 93 dimensioned to receive a hexagonal Allen key which is used to torque the rotor body 69 to the driveshaft 24. The rotor cap 90 therefore releasably couples the rotor 60 to the driveshaft 24 so that the rotor 60 may be easily removed and repaired or replaced if necessary using the Allen key. The rounded cone shaped cap body 91 may provide a streamlined flow path for mud and may reduce wear of the rotor projections 62 caused by recirculation of mud. The rounded cap body 91 may also reduce torque required to rotate the rotor 60 by reducing turbulence downhole of the rotor 60. Positioning the rotor body 69 in the bore of the stator body 41 may protect the rotor body 69 from wear caused by mud erosion.

The radially extending rotor projections 62 are equidistantly spaced around the downhole end of the rotor body 69 and are axially adjacent and downhole relative to the stator projections 42. The rotor projections 62 rotate in and out of fluid communication with the stator flow channels 43 to generate pressure pulses 5, 6 as is described in more detail below. Each rotor projection 62 has a radial profile including an uphole face 66 and a downhole end 65, with two opposed side faces 67 and an end face 61 extending between the uphole face 66 and the downhole end 65. The rotor projections 62 taper from the end face 61 towards the rotor body 69 so that the rotor projections 62 are narrower at the point that joins the rotor body 69 than at the end face 61. Each side face 67 has a bevelled or chamfered uphole edge 68 which is angled inwards towards the uphole face 66 such that an uphole section of the radial profile of each of the rotor projections 62 tapers in an uphole direction towards the uphole face 66. A downhole section of the radial profile of each of the rotor projections 62 also tapers in the downhole direction towards the downhole end 65, such that the width of the end face 61 tapers towards the downhole end 65. The width of the end face 61 is therefore widest at a point in between the uphole face 66 and the downhole end 65 of the rotor projections 62 and the width of the end face 61 tapers from this widest point in both the uphole and downhole directions. In addition, each rotor projection 62 is longitudinally extended and tapers radially in the downhole direction, such that the radial thickness of the uphole face 66 is greater than the radial thickness of the downhole end 65 giving the rotor projections 62 a wedge like shape. The wedge shaped rotor projections 62 therefore taper both along their axis and radially. The wedge shaped rotor projections 62 may be stronger and less fragile compared to the rotor projections 62 which are not longitudinally extending or radially tapered. In addition, the radial taper of the wedge shaped rotor projections 62 may reduce the amount of recirculation of mud downstream of the rotor projections 62 compared to fluid pressure pulse generators 30 having a sudden mud expansion region downstream of the rotor projections 62. Reducing the amount of recirculation of mud downstream of the rotor projections 62 may reduce erosion and cavitations of the rotor 60 and stator 40 caused by recirculation of mud.

In alternative embodiments (not shown) the rotor projections 62 may be any shape and need not be longitudinally extended or radially tapered with a wedge like shape or they may not have a bevelled uphole edge 68 or any taper. The innovative aspects apply equally in embodiments such as these.

Figure 4A:
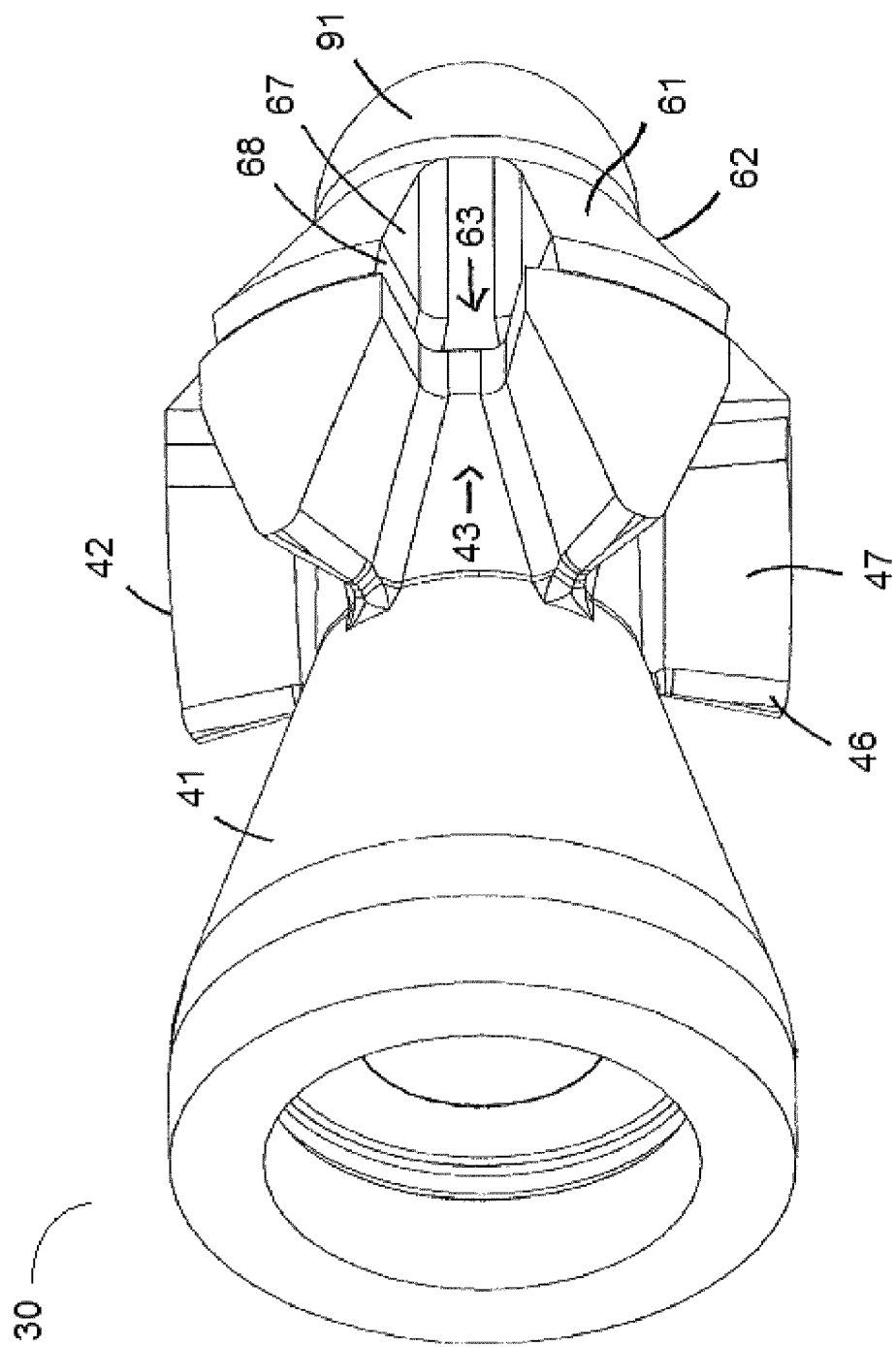
FIGS. 4A and 4B are perspective views of the fluid pressure pulse generator with the rotor in an open flow position.
Figure 4B:
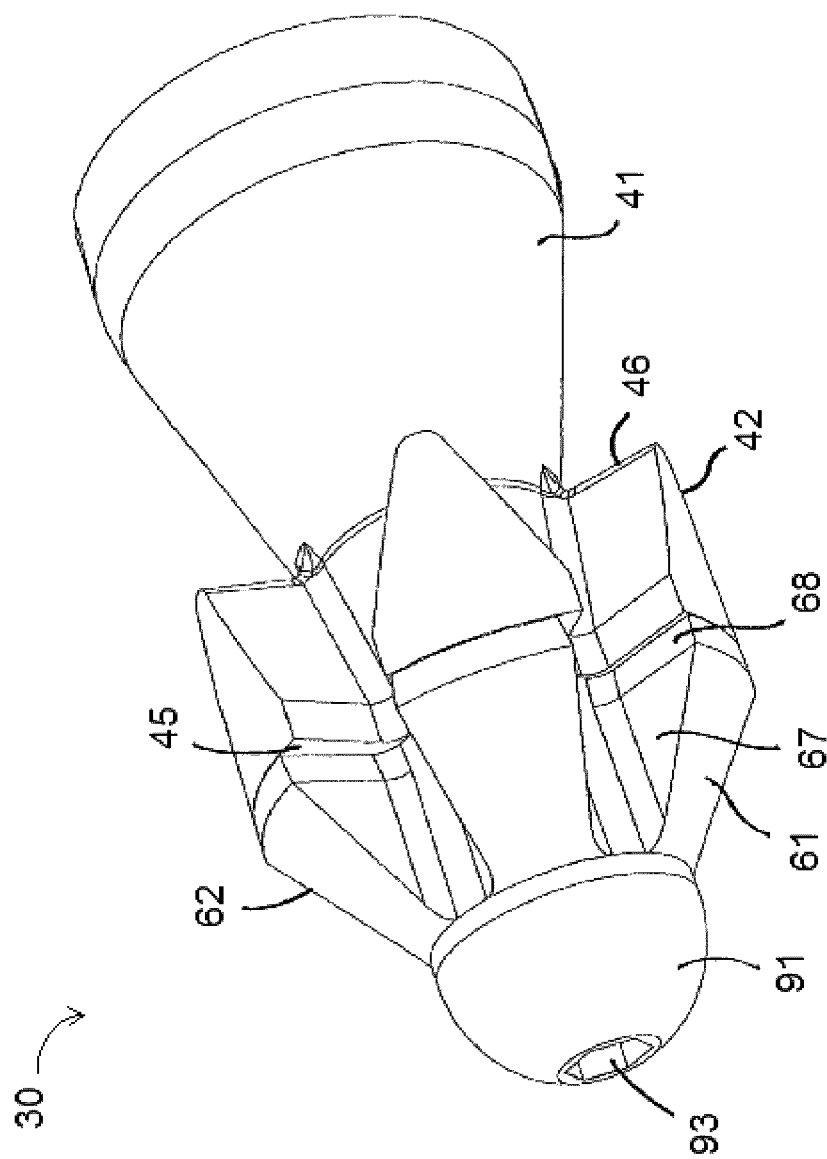
Figure 5:
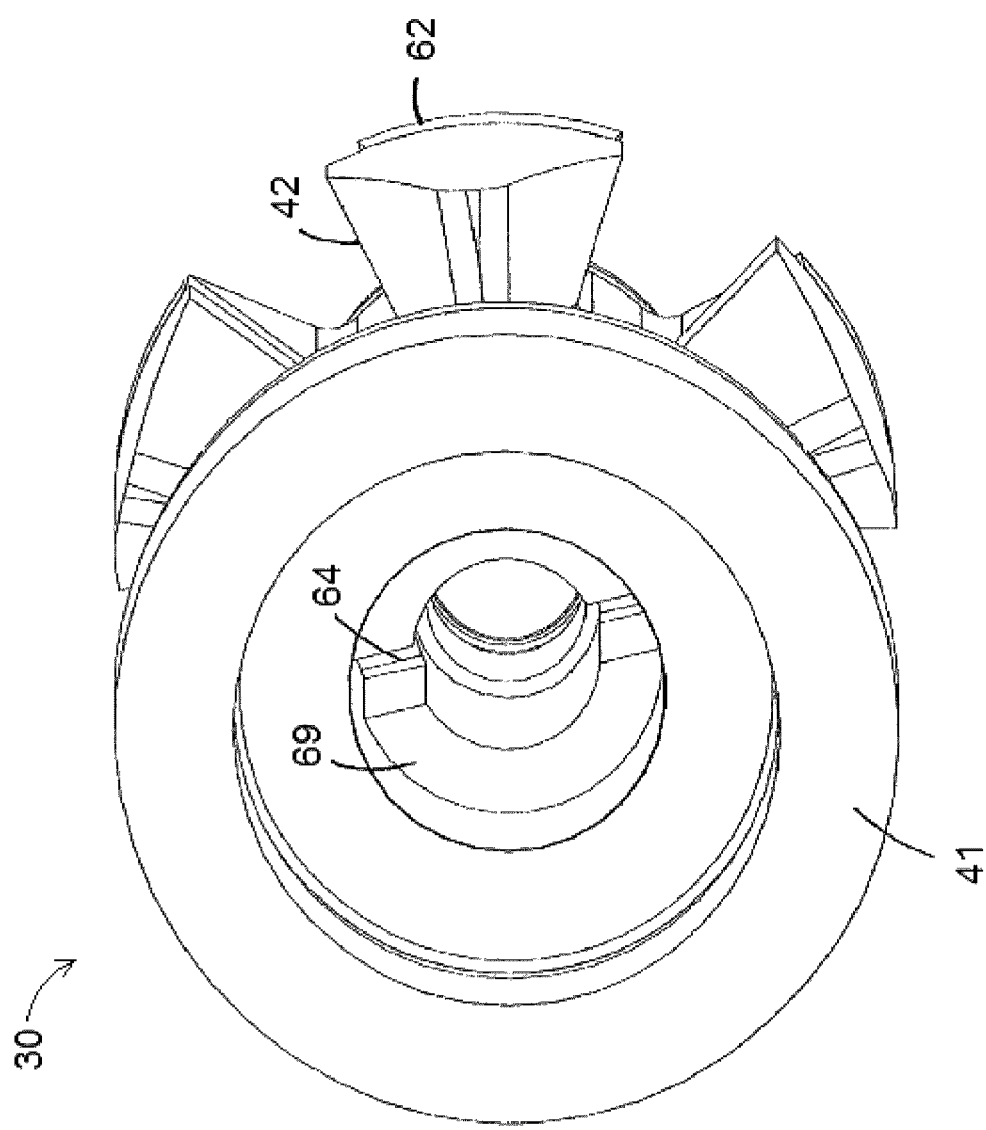
FIG. 5 is a perspective view of the uphole end of the fluid pressure pulse generator with the rotor in the open flow position.
Figure 8A:
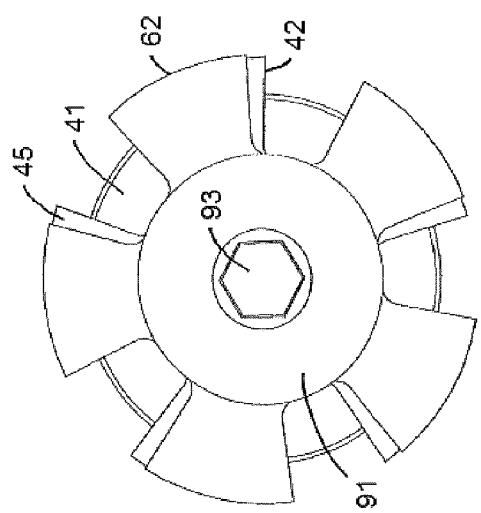
FIGS. 8A, 8B and 8C are end views of the downhole end of the fluid pressure pulse generator with the rotor in the open flow position, the partial restricted flow position and the full restricted flow position respectively.

In the open flow position shown in FIGS. 4A, 4B and 8A, rotor flow channels 63 defined by the side faces 67 of adjacently positioned rotor projections 62 align with and are in fluid communication with the stator flow channels 43, so that mud flows freely through the flow channels 43, 63 resulting in no pressure pulse. The rotor flow channels 63 are curved or rounded at the proximal end closest to the rotor body 69 for smooth flow of mud therethrough which may reduce wear of the rotor projections 42. The rotor projections 62 each align with one of the stator projections 42. The uphole face 66 of each rotor projection 62 is narrower than the downhole face 45 of the aligned stator projection 42 and the rotor projections 62 are not centrally positioned with respect to the stator projections 42; instead an axial central line of the rotor projections 62 is circumferentially offset from an axial central line of the stator projections 42.

Figure 7:
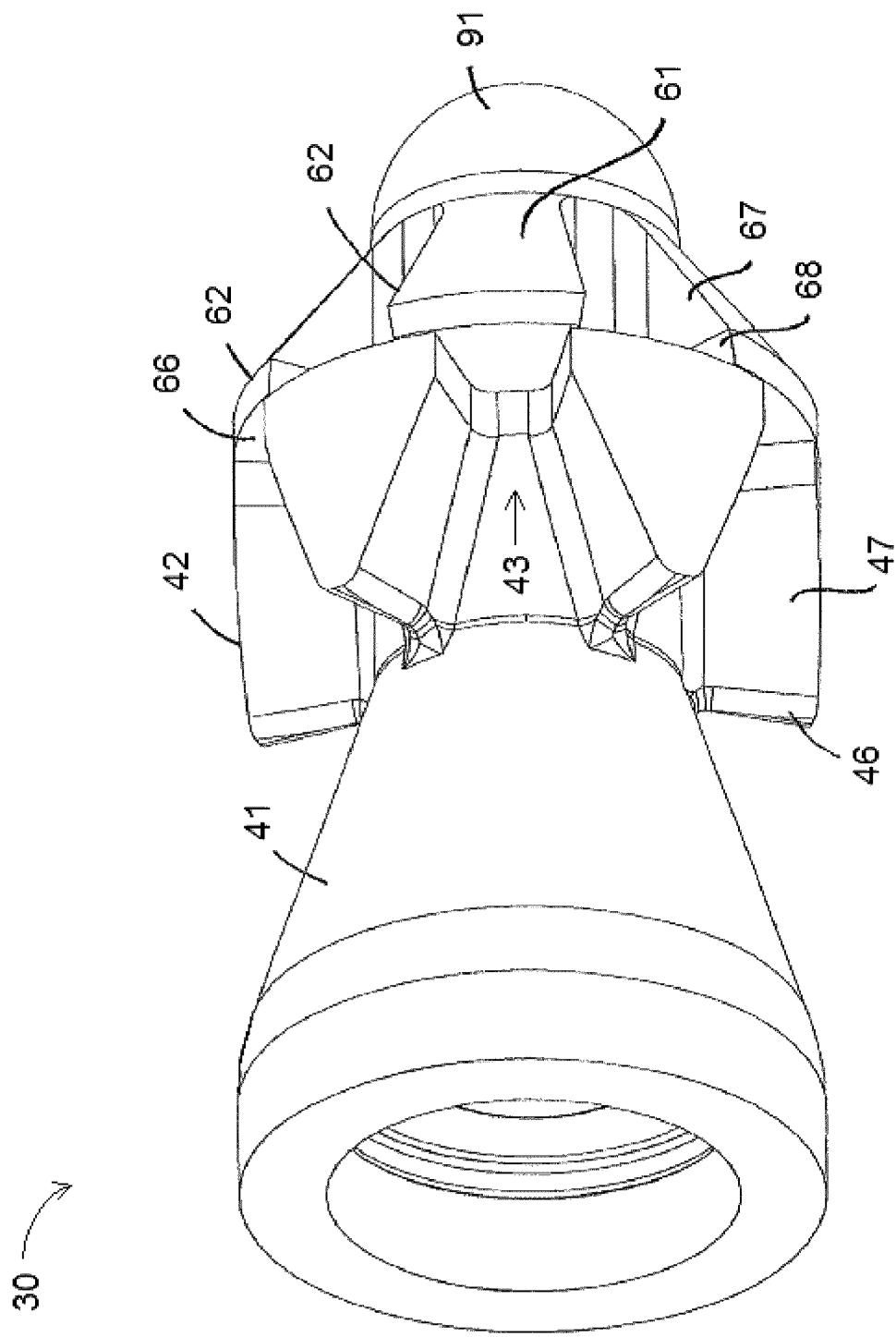
FIG. 7 is a perspective view of the fluid pressure pulse generator with the rotor in a full restricted flow position.
Figure 8B:
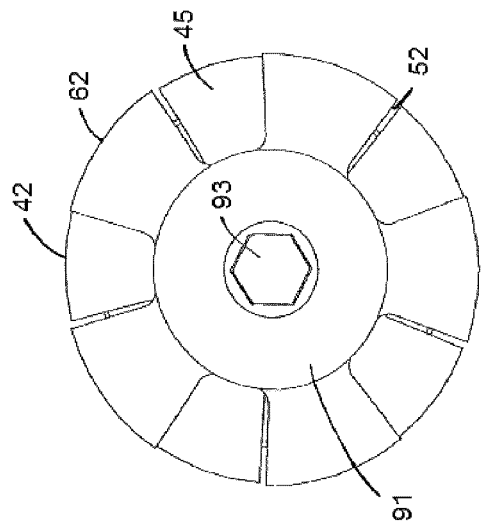
Figure 8C:
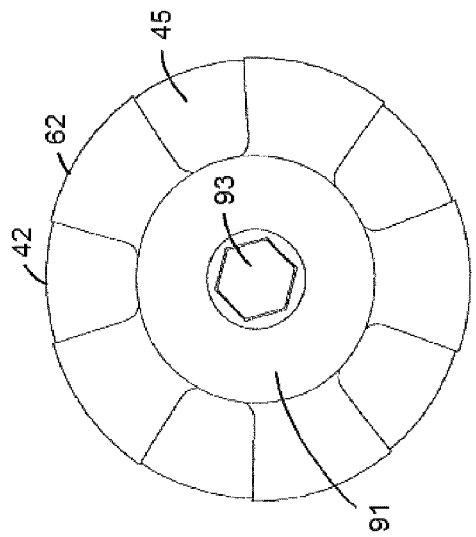

To generate the full pressure pulse 6, the rotor 60 rotates from the open flow position thirty degrees counter clockwise to the full restricted flow position shown in FIGS. 7 and 8C. In the full restricted flow position the rotor projections 62 align with the stator flow channels 43 and flow of mud through the stator flow channels 43 is restricted generating full pressure pulse 6. The rotor then rotates thirty degrees clockwise back to the open flow position.

Figure 6:
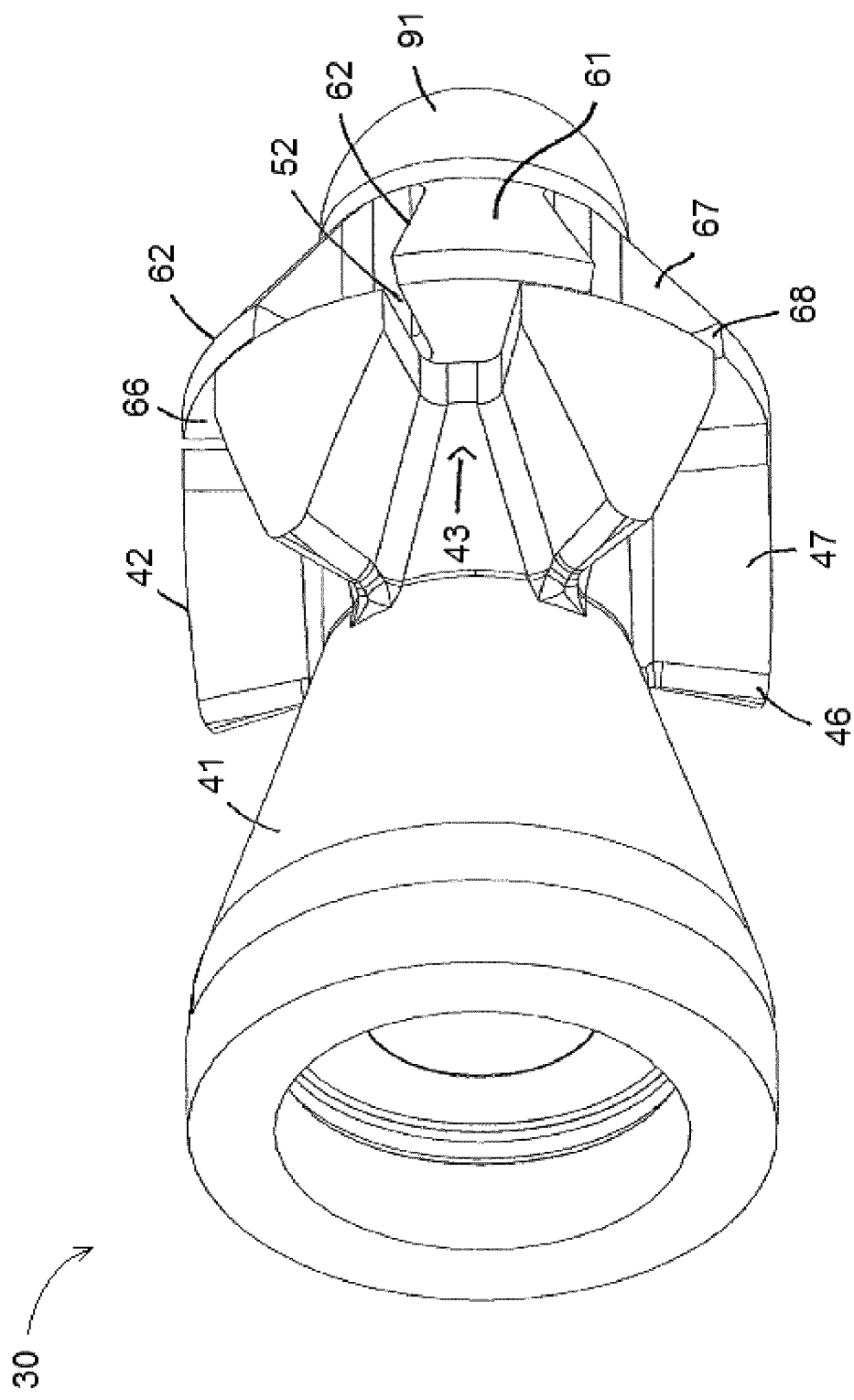
FIG. 6 is a perspective view of the fluid pressure pulse generator with the rotor in a partial restricted flow position.

To generate the reduced pressure pulse 5, the rotor 60 rotates from the open flow position thirty degrees clockwise to the partial restricted flow position shown in FIGS. 6 and 8B. In the partial restricted flow position the rotor projections 62 partially align with the stator flow channels 43. A gap 52 between the stator projections 42 and the rotor projections 62 allows some mud to flow from the stator flow channels 43 to the rotor flow channels 63; however the flow of mud through the stator flow channels 43 is partial restricted by the rotor projections 62 generating reduced pressure pulse 5. The rotor then rotates thirty degrees counter clockwise back to the open flow position. As more mud can flow through the fluid pressure pulse generator 30 when the rotor 60 is in the partial restricted flow position than when the rotor 60 is in the full restricted flow position, reduced pressure pulse 5 is smaller in height than full pressure pulse 6.

As discussed above, the rotor projections 62 are narrower and circumferentially offset with regards to the stator projections 42. This results in a larger proportion of each rotor projection 62 being in fluid communication with the stator flow channels 43 when the rotor 60 rotates thirty degrees counter clockwise from the open flow position to the full restricted flow position than when the rotor 60 rotates thirty degrees clockwise from the open flow position to the partial restricted flow position. Therefore the amount of mud that can flow from the stator flow channels 43 through the rotor flow channels 63 in the full restricted flow position is less than the amount of mud that can flow from the stator flow channels 43 through the rotor flow channels 63 in the partial restricted flow position, generating full pressure pulse 6 and reduced pressure pulse 5 respectively. The rotor 60 is rotated an equal span of rotation (i.e. thirty degrees) from the open flow position clockwise to the partial restricted flow position and from the open flow position counter clockwise to the full restricted flow position, to generate the full and reduced pressure pulses 5, 6 respectively. The fluid pressure pulse generator 30 is therefore able to generate pressure pulses 5, 6 with different pulse heights through equal or symmetrical rotation of the rotor 60 in the clockwise and counter clockwise direction from the open flow position. The MWD tool 20 of the disclosed embodiments may therefore use mechanical features of the fluid pressure pulse generator 30 to generate pressure pulses 5, 6 with different pulse heights through symmetrical rotation of the rotor 60 rather than having to rely on electronic capabilities of the motor and the controller to be able to rotate the rotor 60 a different rotational span in the clockwise and counter clockwise direction to generate pressure pulses with different pulse heights. Symmetrical rotation of the rotor 60 about a central start (open flow) position may also help maintain accurate calibration of the rotor 60 relative to the stator 40.

In alternative embodiments (not shown) the equal span of rotation of the rotor 60 from the open flow position to the full and partial restricted flow positions may be more or less than thirty degrees, however in each embodiment there is a substantially equal span of rotation from the open flow position in one direction to the full restricted flow position and in the opposite direction to the partial restricted flow position. The substantially equal span of clockwise and counter clockwise rotation is selected so that there is a gap 52 between the rotor projections 62 and the stator projections 42 when the rotor 60 is in the partial restricted flow position in order to generate reduced pressure pulse 5. There may also be a gap between the rotor projections 62 and the stator projections 42 when the rotor 60 is in the full restricted flow position, however due to the circumferential offset of the rotor projections 62 relative to the stator projections 42, the gap in the full restricted flow position is less than the gap 52 in the partial restricted flow position so that less mud flows through the fluid pressure pulse generator 30 in the full restricted flow position than in the partial restricted flow position. Alternatively, there may be no gap in the full restricted flow position as provided in the embodiment shown in FIG. 7.

During operation of the fluid pressure pulse generator 30, the rotor 60 oscillates back and forth between the open flow position and the full and partial restricted flow positions in a staged oscillation method to generate a pattern of pressure pulses 5, 6. More specifically, the rotor 60 starts in the open flow position with zero pressure and rotates to either the full restricted flow position or the partial restricted flow position depending on the pressure pulse pattern desired. The rotor 60 returns to the open flow position before generating the next pressure pulse which allows for a constant reset of timing and position for signal processing and precise control. The open flow position at the central point of the rotational span of the rotor 60 provides zero pressure and a clear indication of the end of a previous pulse and start of a new pulse. Also if the rotor 60 is impacted or knocked during operation or otherwise moves out of position, the rotor 60 can return to the open flow position to recalibrate and start over. This may reduce the potential for error over the long term performance of the fluid pressure pulse generator 30.

A precise pattern of pressure pulses can be generated through rotation of the rotor 60 from the open flow position an equal span of clockwise and counter clockwise rotation (e.g. thirty degrees in a clockwise direction and thirty degrees in a counter clockwise direction). As the rotor 60 is rotated in both clockwise and counter clockwise directions, there may be less wear than if the rotor is only rotated in one direction. Furthermore, the span of rotation is limited which may reduce wear of the motor, seals, and other components associated with rotation. In alternative embodiments (not shown) more or less rotor projections 62 and stator projections 42 may be present on the fluid pressure pulse generator 30 and the span of rotation of the described staged oscillation method may vary depending on the amount of rotation required to rotate the rotor between the open flow position and the full and partial restricted flow positions. The frequency of pressure pulses 5, 6 that can be generated may be increased with a reduced span of rotation of the rotor 60 and, as a result, the data acquisition rate may be increased.

It will be evident from the foregoing that provision of more stator projections 42 and rotor projections 62 will reduce the amount of rotation required to move the rotor 60 between the open and restricted flow positions, thereby increasing the speed of data transmission; however the number of stator projections 42 and rotor projections 62 may be limited by the circumferential area of the stator body 41 and rotor body 69 being able to accommodate the stator projections 42 and rotor projections 62 respectively. In order to accommodate more stator projections 42 and rotor projections 62 if data transmission speed is an important factor, the width of the stator projections 42 and rotor projections 62 can be decreased to allow for more stator projections 42 and rotor projections 62 to be present. The innovative aspects apply equally in embodiments such as these.

Provision of multiple stator projections 42 and rotor projections 62 provides redundancy and allows the fluid pressure pulse generator 30 to continue working when there is damage to one of the stator projections 42 and/or rotor projections 62 or blockage of one of the stator flow channels 43 and/or rotor flow channels 63. Cumulative flow of mud through the remaining undamaged or unblocked stator flow channels 43 and/or rotor flow channels 63 may still result in generation of detectable pressure pulses 5, 6, even though the pulse heights may not be the same as when there is no damage or blockage.

Provision of two restricted flow positions which generate different pulse heights enables the fluid pressure pulse generator 30 to operate using the full restricted flow position, the partial restricted flow position or both restricted flow positions to generate pressure pulses depending on mud flow conditions downhole. For example, for high mud flow rate conditions, the pressure generated when the rotor 60 is in the full restricted flow position may be too great and cause damage to the fluid pressure pulse generator 30. The fluid pressure pulse generator 30 may therefore operate using only the partial restricted flow position to generate reduced pressure pulses 5 detectable at the surface. For lower mud flow rate conditions, reduced pressure pulses 5 generated by rotation of the rotor 60 to the partial restricted flow position may be too small to be detectable at the surface. The fluid pressure pulse generator 30 may therefore operate using only the full restricted flow position to generate full pressure pulses 6 detectable at the surface. Thus it may be possible for downhole drilling to continue when the mud flow conditions change without having to change the fluid pressure pulse generator 30. For normal mud flow conditions, the fluid pressure pulse generator 30 may operate using both the full restricted flow position and the partial restricted flow position to produce different height pressure pulses 5, 6 to increase the data transmission rate of the fluid pressure pulse generator 30.

The bevelled edges 68 of the side faces 67 of the rotor projections 62 provide a self correction mechanism to move the rotor 60 to the open flow position if there is failure of the motor and gearbox subassembly 23, driveshaft 24 or any other component of the MWD tool 20 that results in rotation of the rotor 60 stopping during downhole operation. More specifically, if the pulser assembly 26 fails when the bevelled edges 68 of the side faces 67 of the rotor projections 62 are in the mud flow path, mud impinging on the bevelled edges 68 causes the rotor projections 62 to move in a counter clockwise or clockwise direction until the rotor 60 reaches the open flow position. The direction the rotor 60 moves to reach the open flow position depends on the angle of the bevelled edges 68 in the mud flow path. Once the rotor 60 reaches the open flow position, both bevelled edges 68 of the rotor projections 62 are positioned below the stator projections 42 and out of the mud flow path and the rotor 60 remains stationary until the driveshaft 24 and rotor 60 is once again rotated by the motor and gearbox subassembly 23. The tapered stator projections 42 may direct mud towards the bevelled edges 68 and may increase the rotational force created by mud impinging on the bevelled edges 68.

In alternative embodiments (not shown) the angle of the bevelled edge 68 of one side face 67 may be different to the angle of the bevelled edge 68 of the opposed side face 67 of each rotor projection 62, or only one of the opposed side faces 67 may include a bevelled edge 68. The proportion of each side face 67 that is angled or bevelled may also vary and in alternative embodiments (not shown) the rotor projections 62 may taper from the downhole end 65 to the uphole face 66. In further alternative embodiments, none or not all of the rotor projections 62 may have a bevelled edge 68 and some side faces 67 may instead be perpendicular to or angled away from the uphole face 66.

Rotational force provided by the motor and gearbox subassembly 23 may be required to rotate the rotor 60 from the open flow position to the restricted flow positions. If the applied rotational force stops, the rotor 60 will self correct and move to the open flow position and remain in the open flow position until the rotational force is applied again. Providing a self-correcting rotor 60 that moves to the open flow position if there is failure of the pulser assembly may reduce pressure build up caused by the rotor 60 being held in the full restricted flow position, or partial restricted flow position for an extended period of time following failure of the pulser assembly 26. Without self-correction, the pressure build up may lead to damage of the rotor 60 and/or stator 40. The pressure build up may also lead to failure of the pumps or piping on surface. Furthermore, self correction of the rotor 60 to the open flow position may reduce or prevent debris or loss circulation material (LCM) build up which could plug the drill collar 27 and restrict mud flow. Self correction of the rotor 60 to the open flow position may also reduce the torque required to rotate the rotor 60 from the restricted flow positions to the open flow position during normal operation. In alternative embodiments (not shown), the rotor may include an alternative self-correction mechanism, or no self-correction mechanism, and the bevelled edges 68 of the rotor projections 62 and taper of the stator projections 42 may not be present.

In alternative embodiments (not shown), the rotor projections 62 may be axially adjacent and uphole relative to the stator projections 42. The stator projections 42 may be narrower than the rotor projections 62 to protect the downhole stator projections 42 from wear. In further alternative embodiments (not shown), the fluid pressure pulse generator 30 may be positioned at the uphole end of the MWD tool 20. In these alternative embodiments, the rotor projections 62 are circumferentially offset with respect to the stator projections 42 when the rotor 60 is in the open flow position and there is symmetrical or equal span of rotation of the rotor projections 62 relative to the stator projections 42 from the open flow position in one direction to the full restricted flow position and in the opposite direction to the partial restricted flow position to generate full pressure pulse 6 and reduced pressure pulse 5 respectively. A greater proportion of the rotor projections 62 is in fluid communication with the stator flow channels 43 in the full restricted flow position compared to the partial restricted flow position such that more mud can flow through the fluid pressure pulse generator 30 when the rotor 60 is in the partial restricted flow position than in the full restricted flow position.

Figure 9:
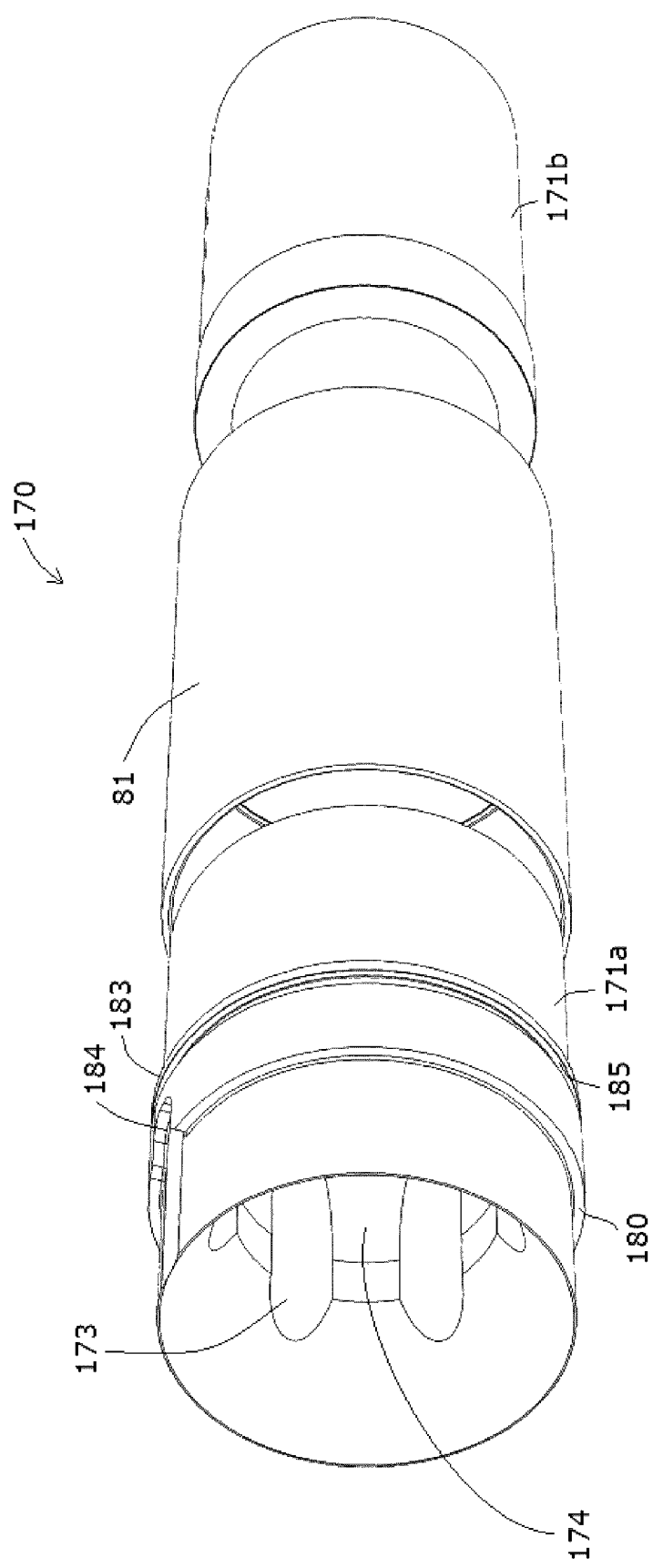
FIG. 9 is an exploded view of the flow bypass sleeve of the first embodiment.
Figure 10:
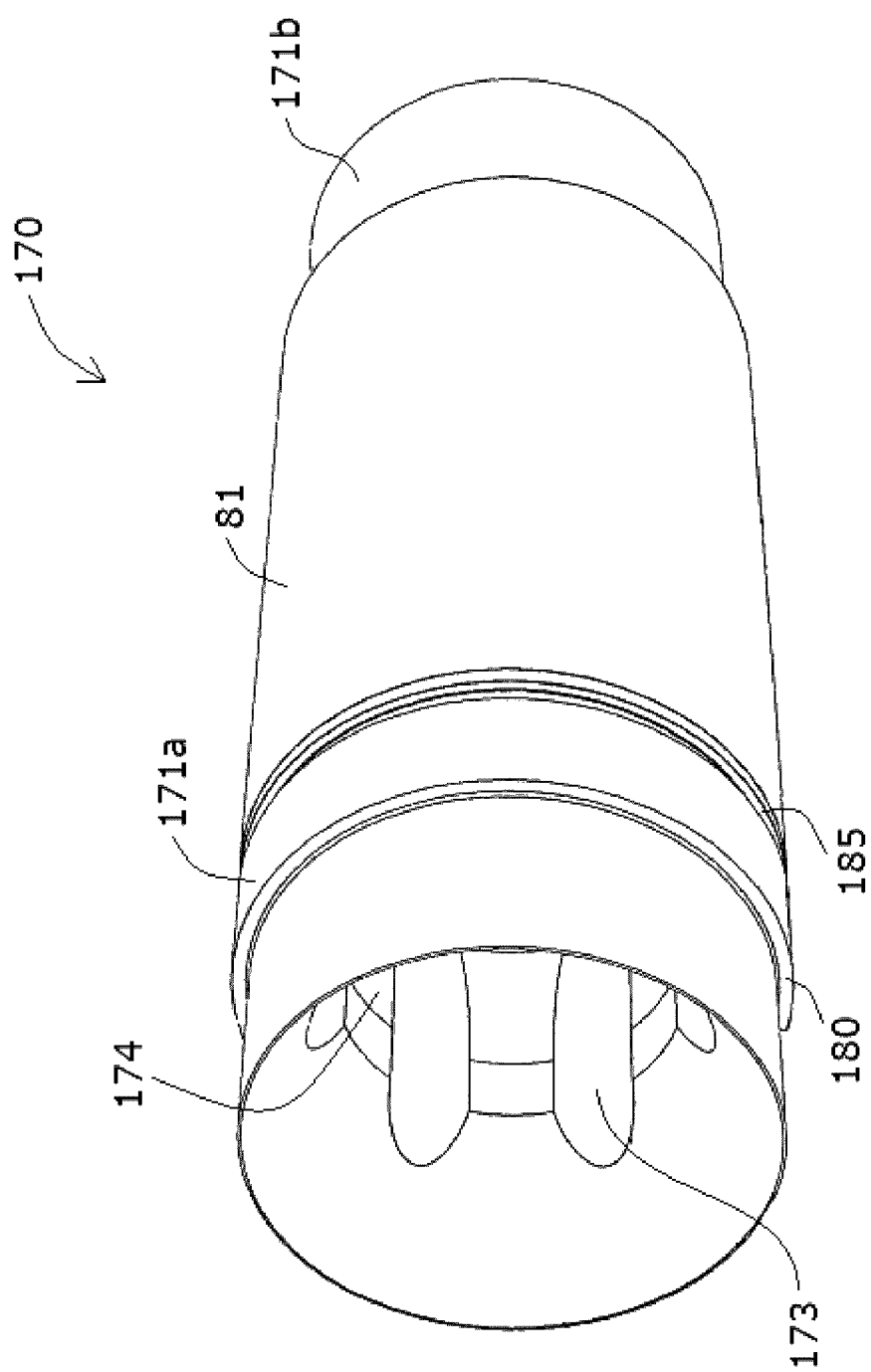
FIG. 10 is a perspective view of the flow bypass sleeve of the first embodiment.
Figure 11:
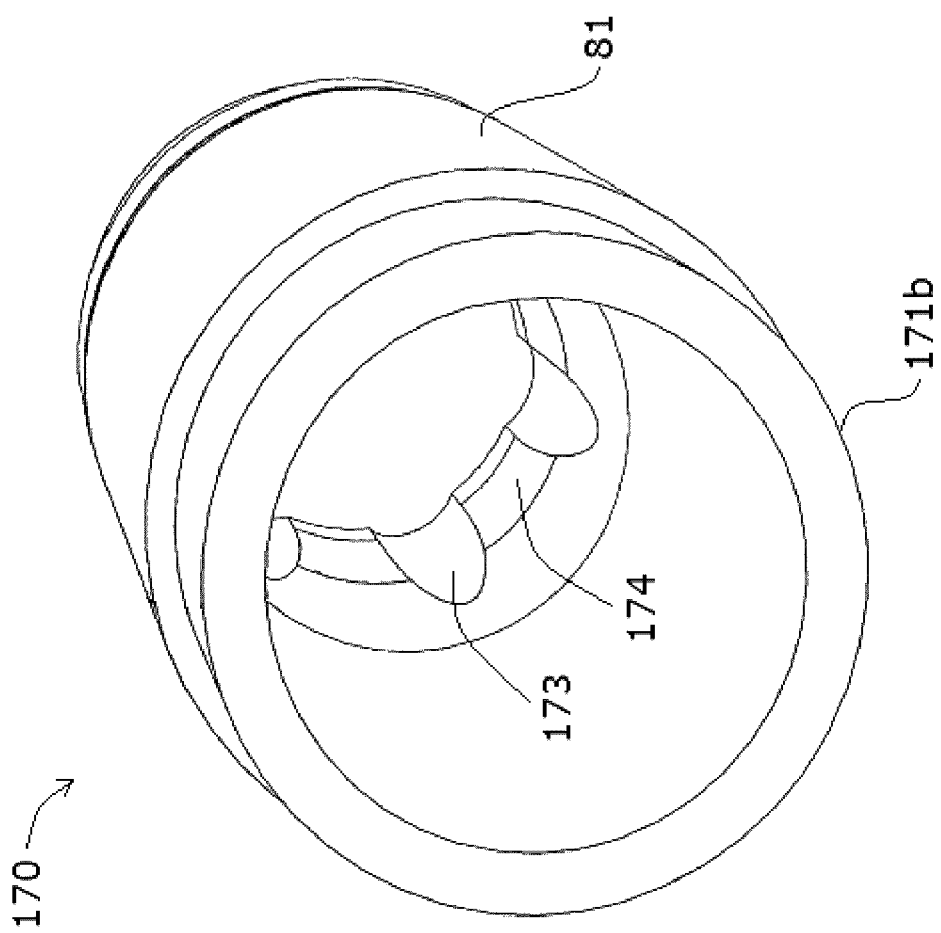
FIG. 11 is a perspective view of the downhole end of the flow bypass sleeve of the first embodiment.
Figure 12:
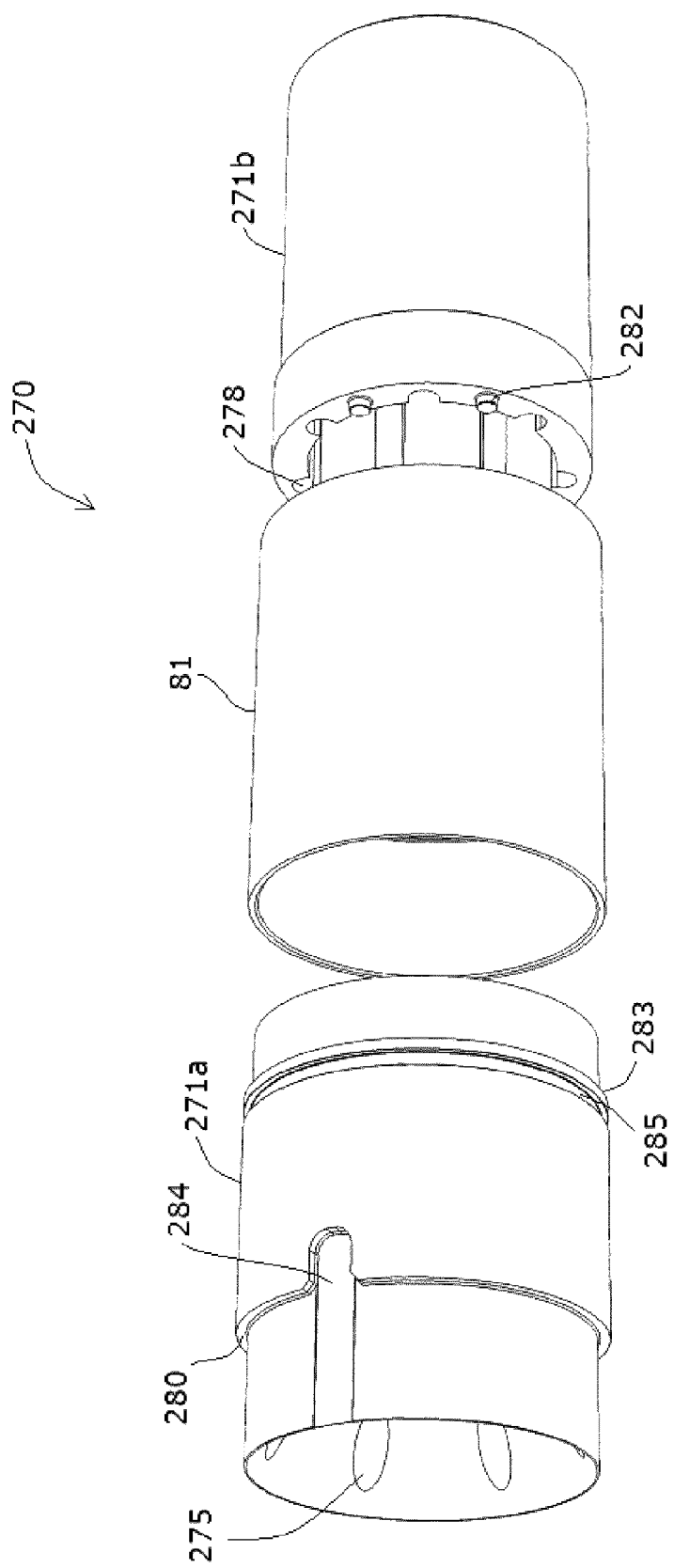
FIG. 12 is an exploded view of a flow bypass sleeve according to a second embodiment.
Figure 13:
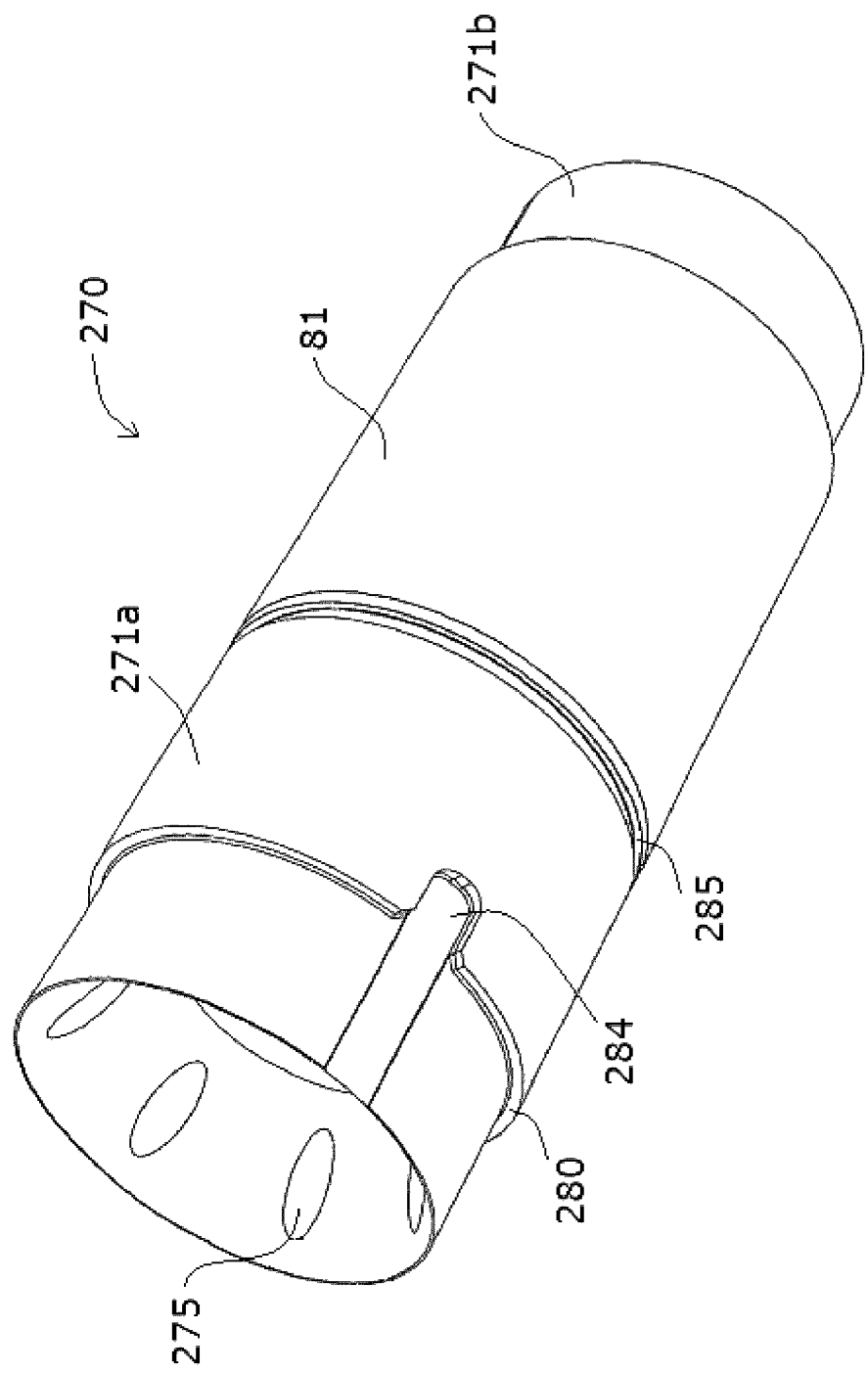
FIG. 13 is a perspective view of the flow bypass sleeve of the second embodiment.
Figure 14:
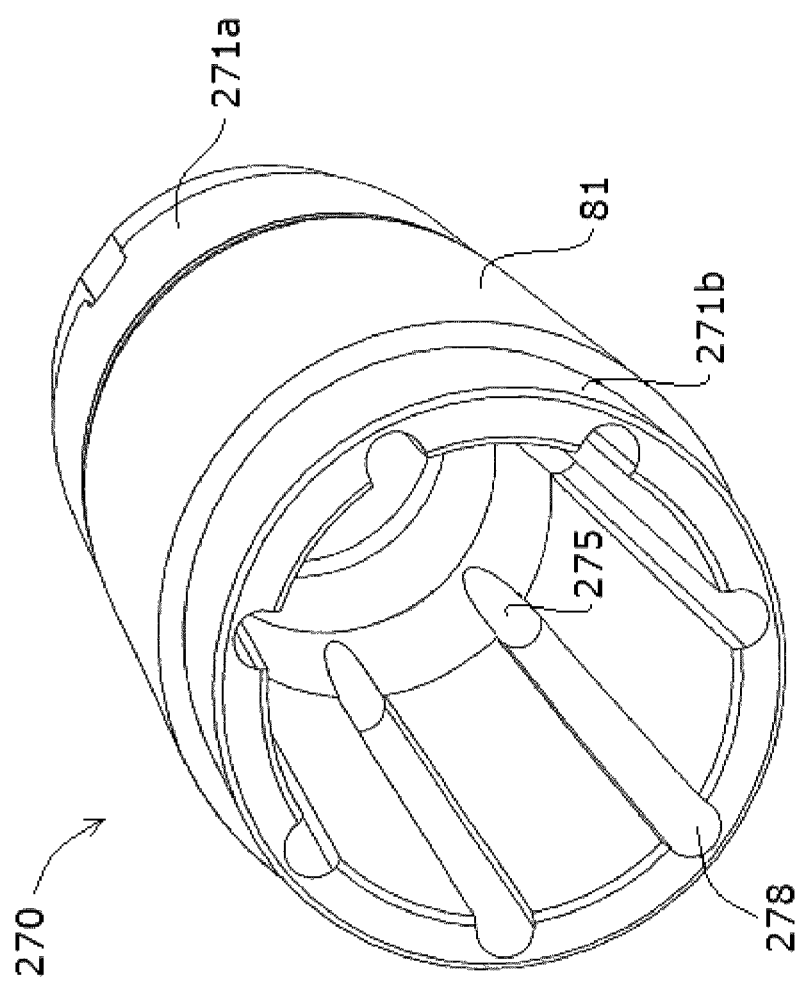
FIG. 14 is a perspective view of the downhole end of the flow bypass sleeve of the second embodiment.

Referring now to FIGS. 9 to 11 there is shown the flow bypass sleeve 170 of the first embodiment comprising a generally cylindrical sleeve body with a central bore therethrough made up of an uphole body portion 171a and a downhole body portion 171b. Referring to FIGS. 12 to 14 a second embodiment of a flow bypass sleeve 270 is shown comprising a generally cylindrical sleeve body with a central bore therethrough made up of an uphole body portion 271a and a downhole body portion 271b.

During assembly of the first and second embodiments of the flow bypass sleeve 170, 270 a lock down sleeve 81 is slid over the downhole end of downhole body portion 171b, 271b and abuts an annular shoulder 183, 283 on the external surface of uphole body portion 171a, 271a respectively. The assembled flow bypass sleeve 170, 270 can then be inserted into the downhole end of drill collar 27. The external surface of uphole body portion 171a, 271a includes an annular shoulder 180, 280 near the uphole end of uphole body portion 171a, 271a respectively which abuts a downhole shoulder of a keying ring (not shown) that is press fitted into the drill collar 27. A keying notch 184, 284 on the external surface of uphole body portion 171a, 271a respectively mates with a projection (not shown) on the keying ring to correctly align the flow bypass sleeve 170, 270 with the pulser assembly 26. A threaded ring (not shown) fixes the flow bypass sleeve 170, 270 within the drill collar 27. A groove 185, 285 on the external surface of the uphole body portion 171a, 271a respectively receives an o-ring (not shown) and a rubber back-up ring (not shown) such as a parbak to help seat the flow bypass sleeve 170, 270 and reduce fluid leakage between the flow bypass sleeve 170, 270 and the drill collar 27. In alternative embodiments the flow bypass sleeve 170, 270 may be assembled or fitted within the drill collar 27 using alternative fittings as would be known to a person of skill in the art.

The lock down sleeve 81 may be made from a material with a higher thermal expansion coefficient than the material of the sleeve body. For example, the lock down sleeve 81 may comprise beryllium copper and the sleeve body may comprise Stellite. Providing different thermal expansion coefficients materials that make up the external surface of the flow bypass sleeve 170, 270 may help clamp the flow bypass sleeve 170, 270 within the drill collar 27 across a wider range of temperatures than a flow bypass sleeve comprising the same material throughout.

As shown in FIG. 2A, the diameter of the bore through the sleeve body is smallest at a central section 177 which surrounds the stator projections 42 and rotor projections 62. The outer diameter of the stator projections 42 may be dimensioned such that the stator projections 42 contact the internal surface of the central section 177 of the sleeve body. The outer diameter of the rotor projections 62 is slightly less than the internal diameter of the central section 177 of the sleeve body to allow rotation of the rotor projections 62 relative to the sleeve body. The bore through the sleeve body gradually increases in diameter from the central section 177 towards the downhole end of the sleeve body to define an internally tapered downhole section 176. The bore through the sleeve body also increases in diameter from the central section 177 towards the uphole end of the sleeve body to define an internally tapered uphole section 179 of sleeve body. The taper of the uphole section 179 is greater than the taper of downhole section 176 of sleeve body. The uphole section 179 of sleeve body surrounds the frusto-conical section of stator body 41 with the annular channel 56 extending therebetween. Mud flows along annular channel 56 and hits the stator projections 42 where it is channelled into the stator flow channels 43. The downhole section 176 of the sleeve body surrounds the rotor cap body 91.

In the first embodiment of the flow bypass sleeve 170, the internal surface of the uphole body portion 171a includes a plurality of longitudinal extending grooves 173. Grooves 173 are equidistantly spaced around the internal surface of the uphole body portion 171a. Internal walls 174 in-between each groove 173 align with the stator projections 42 of the fluid pressure pulse generator 30, and the grooves 173 align with the stator flow channels 43. The flow bypass sleeve 170 is precisely located with respect to the drill collar 27 using keying notch 184 to ensure correct alignment of the stator projections 42 with the internal walls 174. The rotor projections 62 rotate relative to the flow bypass sleeve 170 and move between the open flow position and the full and partial restricted flow positions as described above in more detail.

In the second embodiment of the flow bypass sleeve 270 a plurality of apertures 275 extend longitudinally through the uphole body portion 271a. The apertures 275 are circular and equidistantly spaced around uphole body portion 271a. The internal surface of the downhole body portion 271b includes a plurality of spaced grooves 278 which align with the apertures 275 in the assembled flow bypass sleeve 270 (shown in FIG. 14), such that mud is channeled through the apertures 275 and into grooves 278. Alignment pins 282 on the uphole surface of the downhole body portion 271b align with recesses (not shown) on the downhole surface of the uphole body portion 271a to correctly align the apertures 275 with the grooves 278. The internal surface of uphole body portion 271a which surrounds the rotor and stator projections 162, 142 is uniform in this embodiment; therefore there is no need to align the stator projections 42 with any internal feature of the uphole body portion 271a as with the first embodiment of the flow bypass sleeve 170 described above. The sleeve body generally needs to be wide enough to support the apertures 275 and the drill collar dimensions may be a limiting factor with respect to use of the second embodiment of the flow bypass sleeve 270. As such, the second embodiment of the flow bypass sleeve 270 may be used with larger drill collars 27, for example drill collars that are 8 inches or more in diameter. In alternative embodiments (not shown) the apertures 275 may be any shape and need not be equidistantly spaced around the sleeve body. The number and size of the apertures 275 may be chosen for the desired amount of mud flow therethrough. In further alternative embodiments (not shown) the grooves 278 may have a different shape or may not be present at all.

The external dimensions of flow bypass sleeve 170, 270 may be adapted to fit any sized drill collar 27. It is therefore possible to use a one size fits all fluid pressure pulse generator 30 with multiple sized flow bypass sleeves 170, 270 with various different external circumferences that are dimensioned to fit different sized drill collars 27. Each of the multiple sized flow bypass sleeves 170, 270 may have the same internal dimensions to receive the one size fits all fluid pressure pulse generator 30 but different external dimensions to fit the different sized drill collars 27.

In larger diameter drill collars 27 the volume of mud flowing through the drill collar 27 will generally be greater than the volume of mud flowing through smaller diameter drill collars 27, however the bypass channels of the flow bypass sleeve 170, 279 may be dimensioned to accommodate this greater volume of mud. The bypass channels of the different sized flow bypass sleeves 170, 270 may therefore be dimensioned such that the volume of mud flowing through the one size fits all fluid pressure pulse generator 30 fitted within any sized drill collar 27 is within an optimal range for generation of pressure pulses 5, 6 which can be detected at the surface without excessive pressure build up. It may therefore be possible to control the flow rate of mud through the fluid pressure pulse generator 30 using different flow bypass sleeves 170, 270 rather than having to fit different sized fluid pressure pulse generators 30 to the pulser assembly 26.

In alternative embodiments (not shown), the fluid pressure pulse generator 30 may be present in the drill collar 27 without the flow bypass sleeve 170, 270. In these alternative embodiments, the stator projections 42 and rotor projections 62 may be radially extended to have an external diameter that is greater than the external diameter of the cylindrical section of the stator body 41, such that mud following along annular channel 55 impinges on the stator projections 42 and is directed through the stator flow channels 43. The stator projections 42 and rotor projections 62 may radially extend to meet the internal surface of the drill collar 27. There may be a small gap between the rotor projections 62 and the internal surface of the drill collar 27 to allow rotation of the rotor projections 62. The innovative aspects apply equally in embodiments such as these.

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:

1. A fluid pressure pulse generator apparatus for a downhole telemetry tool, comprising:
    (a) a stator comprising a stator body and a plurality of radially extending stator projections spaced around the stator body, whereby adjacently spaced stator projections define stator flow channels extending therebetween; and
    (b) a rotor comprising a rotor body and a plurality of radially extending rotor projections spaced around the rotor body, whereby adjacently spaced rotor projections define rotor flow channels extending therebetween,
wherein the rotor projections are axially adjacent the stator projections and the rotor is rotatable relative to the stator and configured to oscillate from an open flow position an equal span of clockwise and counter clockwise rotation to first and second restricted flow positions, wherein in the open flow position the rotor projections align with the stator projections with an axial central line of the stator projections circumferentially offset from an axial central line of the rotor projections and the rotor flow channels are in fluid communication with the stator flow channels so that drilling fluid flows through the fluid pressure pulse generator apparatus, and in the first and second restricted flow positions the rotor projections are in fluid communication with the stator flow channels to create a pressure pulse in the drilling fluid flowing through the fluid pressure pulse generator apparatus, wherein the equal span of clockwise and counter clockwise rotation is selected so that a gap is formed between the rotor projections and the stator projections in at least one of the first and second restricted flow positions for flow of drilling fluid therethrough and a greater proportion of the rotor projections is in fluid communication with the stator flow channels in one of the first and second restricted flow positions than in the other of the first and second restricted flow positions.

2. The apparatus of claim 1, wherein the rotor projections are downhole relative to the stator projections.

3. The apparatus of claim 2, wherein the rotor projections have a radial profile with an uphole end, a downhole end and two opposed side faces extending therebetween and a section of the radial profile of at least one of the rotor projections is tapered towards the uphole end, whereby if rotation is stopped when the tapered section of the at least one rotor projection is in fluid communication with the stator flow channels the drilling fluid impinging on the tapered section moves the rotor until the tapered section of the at least one rotor projection is out of fluid communication with the stator flow channels.

4. The apparatus of claim 3, wherein at least one of the side faces of the tapered rotor projection has a bevelled uphole edge.

5. The apparatus of claim 3, wherein both of the side faces of the tapered rotor projection have a bevelled uphole edge.

6. The apparatus of claim 2, wherein the stator projections have a radial profile with an uphole end, a downhole end and two opposed side faces extending therebetween.

7. The apparatus of claim 6, wherein the uphole end of at least one of the stator projections is rounded.

8. The apparatus of claim 6, wherein a section of the radial profile of at least one of the stator projections is tapered towards the uphole end.

9. The apparatus of claim 2, wherein at least one of the rotor projections tapers radially in the downhole direction.

10. The apparatus of claim 9, wherein the at least one radially tapered rotor projection is longitudinally extended.

11. The apparatus of claim 2, wherein an uphole end of the stator body is configured to couple with a downhole end of a pulser assembly of the downhole telemetry tool.

12. The apparatus of claim 11, wherein the stator body has a bore therethrough and at least a portion of the rotor body is received within the bore.

13. The apparatus of claim 12, wherein the rotor body has a bore therethrough configured to receive a downhole portion of a driveshaft extending from the pulser assembly.

14. The apparatus of claim 13, wherein the apparatus further comprises a rotor cap comprising a cap body and a shaft which is received in the bore of the rotor body.

15. The apparatus of claim 14, wherein the rotor cap is configured to releasably attach the rotor to the driveshaft.

16. The apparatus of claim 14, wherein a downhole end of the cap body is rounded.

17. A downhole telemetry tool comprising:
    (a) a pulser assembly comprising: a housing enclosing a motor and a driveshaft rotationally coupled to the motor; and
    (b) the fluid pressure pulse generator apparatus of claim 1, wherein the driveshaft is coupled to the rotor and the motor can rotate the driveshaft and the rotor relative to the stator.

18. A method of generating a fluid pressure pulse pattern in downhole drilling fluid comprising a first fluid pressure pulse and a second fluid pressure pulse whereby the first fluid pressure pulse is greater than the second fluid pressure pulse, the method comprising:
    providing the downhole telemetry tool of claim 17; and
    controlling the motor to oscillate the rotor between the open flow position and the first and second restricted flow positions, whereby rotation to one of the first and second restricted flow positions creates the first pressure pulse and rotation to the other of the first and second restricted flow positions creates the second pressure pulse.

* * * * *